(12) United States Patent
Vazquez

(10) Patent No.: US 11,488,494 B2
(45) Date of Patent: Nov. 1, 2022

(54) LAPAROSCOPIC INSTRUMENT HOLDER FOR SURGICAL SIMULATION AND TRAINING

(71) Applicant: Jose Luis Mosso Vazquez, Mexico City (MX)

(72) Inventor: Jose Luis Mosso Vazquez, Mexico City (MX)

( * ) Notice: Subject to any disclaimer, the term of this patent is extended or adjusted under 35 U.S.C. 154(b) by 979 days.

(21) Appl. No.: 16/233,091

(22) Filed: Dec. 27, 2018

(65) Prior Publication Data

US 2019/0197919 A1 Jun. 27, 2019

Related U.S. Application Data

(62) Division of application No. 15/197,639, filed on Jun. 29, 2016, now abandoned.

(51) Int. Cl.
*G09B 23/28* (2006.01)
*G09B 19/24* (2006.01)

(52) U.S. Cl.
CPC ............. *G09B 23/28* (2013.01); *G09B 19/24* (2013.01); *G09B 23/285* (2013.01)

(58) Field of Classification Search
CPC ....... G09B 23/28; G09B 23/285; G09B 19/24
See application file for complete search history.

(56) References Cited

U.S. PATENT DOCUMENTS

| | | | | |
|---|---|---|---|---|
| 3,028,592 A | * | 4/1962 | Parr | G01C 21/165 244/175 |
| 3,047,863 A | * | 7/1962 | Bolie | G01S 3/42 342/422 |
| 6,850,222 B1 | * | 2/2005 | Rosenberg | G09B 23/28 345/157 |
| 2014/0205276 A1 | * | 7/2014 | Johnston | F16M 11/045 396/421 |

* cited by examiner

*Primary Examiner* — Robert J Utama
*Assistant Examiner* — Correll T French
(74) *Attorney, Agent, or Firm* — Robert D. Eisler

(57) ABSTRACT

Innovative instrument holders used for minimally invasive surgical simulation and training are disclosed when used in conjunction with a smartphone, tablet or mini-tablet computer enabling visualization of the surgical field. The surgical field used with these instrument holders can include animal models, physical models, and both virtual and augmented reality models. Some embodiments can be used with applications that can be downloaded to the smartphone, tablet or mini-tablet computer in order to enhance specific hand-eye coordination tasks. Some embodiments can be used as an adjunct surgical trainer for endoscopy, colonoscopy, and other minimally invasive gastrointestinal and gynecological surgical procedures using surgical instruments that incorporate fiber optics.

7 Claims, 11 Drawing Sheets

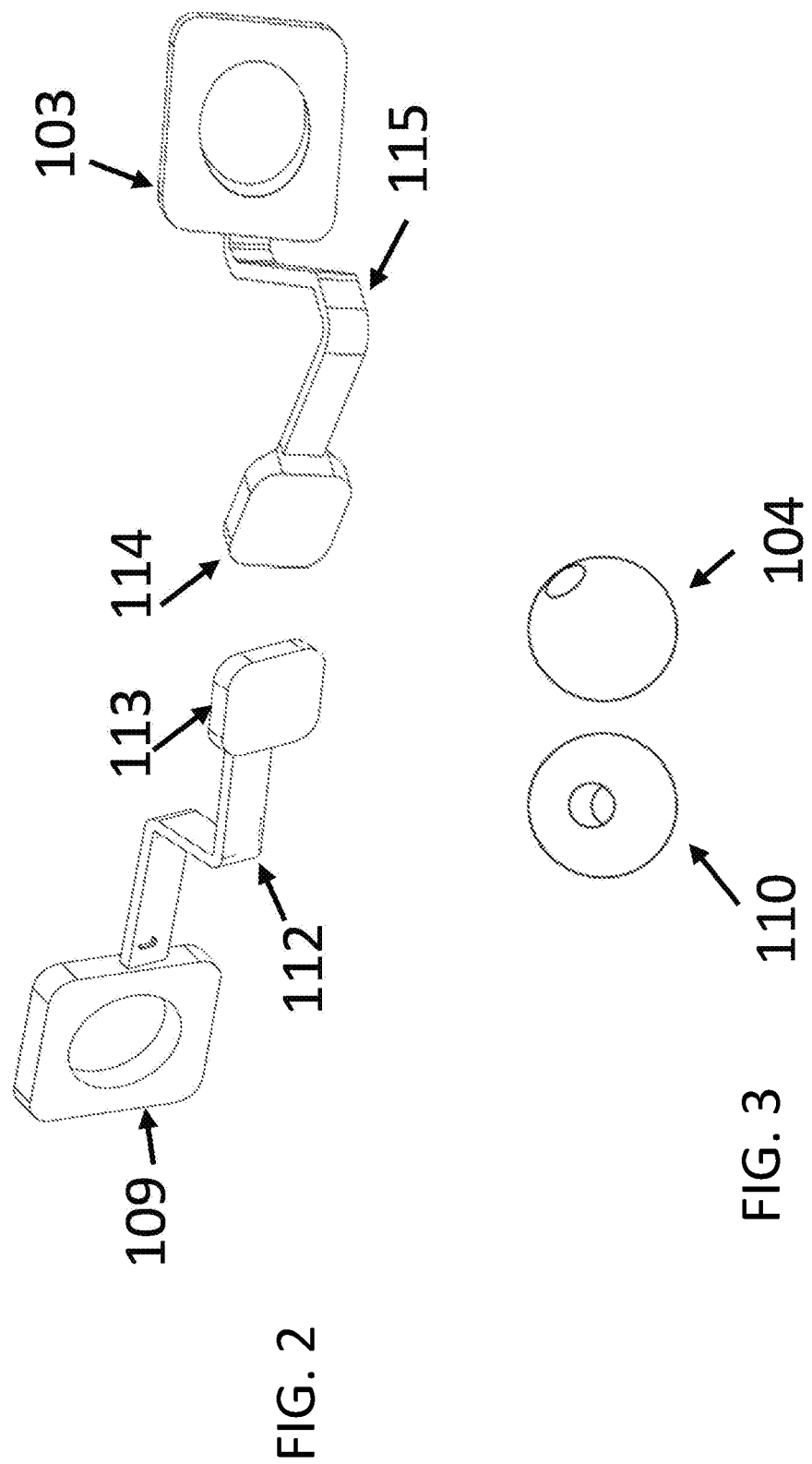

LAPAROSCOPIC INSTRUMENT HOLDER FOR SURGICAL SIMULATION AND TRAINING

COPYRIGHT & TRADEMARK NOTICE

A portion of the disclosure of this patent document contains material, which is subject to copyright protection. The owner has no objection to the facsimile reproduction by anyone of the patent document or the patent disclosure, as it appears in the Patent and Trademark Office patent files or records, but otherwise reserves all copyrights whatsoever.

Certain marks referenced herein may be common law or registered trademarks of third parties affiliated or unaffiliated with the applicant or the assignee. Use of these marks is by way of example and shall not be construed as descriptive or to limit the scope of this invention to material associated only with such marks.

TECHNICAL FIELD OF THE INVENTION

The present invention relates to innovative instrument holders used for minimally invasive surgical simulation and training when used in conjunction with a smartphone, tablet or mini-tablet computer enabling visualization of the surgical field.

BACKGROUND OF THE INVENTION

Disclosed herein are innovative instrument holders used for minimally invasive surgical simulation and training when used in conjunction with a smartphone, tablet or mini-tablet computer enabling visualization of the surgical field. The surgical field used with these instrument holders can include animal models, physical models, and both virtual and augmented reality models. Some embodiments can be used with applications ("apps") that can be downloaded to the smartphone, tablet or mini-tablet computer in order to enhance specific hand-eye coordination tasks. Some embodiments can be used as an adjunct surgical trainer for endoscopy, colonoscopy, and other minimally invasive gastrointestinal and gynecological surgical procedures using surgical instruments that incorporate fiber optics.

Laparoscopic surgery is a minimally invasive surgical technique performed with a specially configured video camera called a laparoscope and several thin surgical instruments. During the surgical procedure, small incisions have trocars through them of various designs and the laparoscope and surgical instruments are introduced into the body cavity through sleeves in the trocar acting as ports. During the procedure the laparoscope transmits images of the internal organs and tissues to an external television monitor in the operating room. This enables the surgeon to manipulate internal tissues using instruments introduced through the non-video ports in the body cavity without directly observing the manipulated tissues except through the transmitted television image.

There are at least three fundamental psychomotor problems in laparoscopic surgery. First, the surgeon's hands move surgical instruments while the surgeon's eyes are averted to an external monitor. The surgeon's eye movement and the movement of the surgeon's hands as displayed on the video monitor are not therefore in the same direction. Second, the surgeon's hands are moving in three dimensions while displayed on a two dimensional video monitor. Finally, haptic feedback using laparoscopic instruments is greatly reduced. For example, in normal surgery, the surgeon's hands can often detect changes in tissue density such as when a tissue is completely cut. However, in laparoscopic surgery, the completion of a tissue cutting procedure may only be evident on the video monitor because of the suppressed haptic feedback. Overcoming these muted sensory cues and hand-eye coordination problems with sufficient competency to perform laparoscopic surgery can entail training exceeding 10 years. A critical element of this training, especially in overcoming altered sensory cues and hand-eye coordination problems alluded to above, are the use of training simulators as an adjunct to surgical education.

Laparoscopic surgical education and training currently employ simulators ranging from simple "box trainers" to sophisticated Virtual Reality (VR) trainers approaching the fidelity of real surgical scenarios. VR simulators are expensive and are generally fixed installations requiring an Information Technology (IT) infrastructure and IT support personnel. VR simulators also often entail prescribed surgical scenarios with diminishing pedagogic significance as the trainee replays training scripts.

Box trainers range in sophistication and generally include a stand that accommodates a camera, typically a third party supplied camera internal to another device such as an IPad® or iPhone®. The camera functions as a surrogate laparoscope or even possibly as an external monitor. The box simulator may also have instrument holders and possibly also laparoscopic instruments integrated with these instrument holders. The camera in these box trainers is focused on a physical model or a small animal where the instruments can be used to manipulate objects and perform surgical tasks on tissues or physical objects within the visual field of the camera.

Box simulators are a valuable adjunct to laparoscopic surgical education outside the surgical suite in that they are less expensive, may be portable, do not encumber valuable hospital or medical school resources, and can promote development of appropriate hand eye coordination skills. Box simulators, however, are currently limited in representing the surgeon's interaction with tissue and mechanical manipulation of laparoscopic instruments. Many box simulators, due to their small size, can only accommodate a limited surgical field and have severely constrained instrument motion. Also, because of the eccentric placement of the camera on a third party device, such as an IPad® or IPhone®, parallax errors and unrealistic spacing between tips of surgical instruments as compared with a real surgical scenario tend to be apparent in the simulator visual field. Because of their limited surgical field, current box simulators also only permit manipulation of physical objects or small animals as opposed to surgical tasks on larger animal models that embodiments of the current invention permit.

Embodiments of the present invention include laparoscopic instrument holders that compensate for eccentric camera placement, allow for an enlarged visual and surgical field enabling surgical tasks to be performed on larger animals than current box simulators, is not specific to a particular tablet of smart phone device, provides realistic spacing in the surgical field between surgical instrument tips, and allows realistic and unconstrained movement of surgical instruments including the camera functioning as a surrogate laparoscope. In other embodiments, a novel device with nested gimbal rings allows augmented reality simulation of endoscopic, bronchoscopic, colonoscopic, gastroscopic and other minimally invasive surgical procedures when used in conjunction with downloadable virtual reality apps of minimally invasive surgical procedures. This embodiment can also be used in conjunction with downloadable apps that are designed enhance hand-eye coordination prerequisite to many minimally invasive surgical tasks.

Currently, there are at least eight box type laparoscopic simulators that have been developed world-wide. These include: (1) Lap Tab—an IPad® Based Laparoscopic Trainer, (2) a Portable Tablet Box Trainer, (3) a Cardboard Box trainer using smartphones and tablets, (4) a Portable laparoscopic trainer for smartphones and tablets—i.e., Surgical trainer based on iPhone® Technology, (5) a Cardboard box iTrainer, (6) LapSkills, (7) eoSim, and (8) a Card Board Box iTrainer. Each of these trainers is discussed below.

(1) IPad® Based Laparoscopic Trainer (Yoon, Junco, et. al., 2015)—This is an open box surgical simulator that uses an IPad® with a third party, commercial "off the shelf" universal supporting base. The system has integrated laparoscopic holders in which instruments are inserted. A limitation of this system is that the holder on the right side of the IPad is located so far from the internal camera lens on the rear of the IPad® that this trainer cannot be used for animal dissections. It also does not allow for use of surgical trocars and the instrument holders are specific to the IPad®.

(2) Lap Tab—Portable Tablet Box Trainer (Aa, Schreuder, et. al., 2015)—This is a folding open box surgical trainer that uses a tablet computer. This trainer provides very limited surgical space and no opportunity to enlarge the surgical field. The system also allows for unrealistic and very constrained movement of surgical instruments. Because the system does not use a tripod, it cannot be easily moved to a convenient user location.

(3) Cardboard Box trainer using smartphones and tablets (Bahsoun, Malk, et. al., 2013)—This is a simulator with a cavity made from a cardboard box where the left the side and rear of the cavity is open to allow for natural light to fill the cavity. An IPad 2® is placed over the box to act as the camera and monitor.

(4) Portable laparoscopic trainer for smartphones and tablets—Surgical trainer based on iPhone Technology (Escamosa, Ordorica, et. al., 2014 and 2015)—This trainer has a folding plastic base to hold a smartphone. The surgical field is limited and surgical instruments have a very limited range of motion.

(5) Cardboard box iTrainer (Ruparel, Brahmbhatt, et. al., 2014)—This a folding open box surgical trainer with a tablet and very limited surgical space to manipulate instruments.

(6) LapSkills from Innovus (http://www.inovus.org/#lap-skills/c380 accessed 20 Jun. 2016)—This is a box surgical trainer used with a smartphone. It has very limited surgical space and does not allow much freedom of motion for surgical instruments. The position of the tablet or phone is fixed.

(7) eoSim (http://www.eosurgical.com accessed 20 Jun. 2016)—This is a box trainer used just to manipulate physical items, i.e., no animal models can be used with this trainer. The surgical field is reduced into a limited box area and the surgical tools are inserted into a fixed location without the use of trocars. The tablet or phone is also in a fixed position.

(8) Card Board Box iTrainer (Van Duren and Van Boxel, 2014)—This is a card board surgical trainer that uses the camera in a smartphone as a laparoscope and a tablet computer as an external screen monitor The surgical instruments are at a fixed location and are used to manipulate physical items only. The tablet or phone are in a fixed position.

All the current box trainers discussed above are relatively portable, easy to use, and inexpensive. They all use real surgical tools and all the box trainers use smartphones, tablet computers or both as a surrogate for a laparoscope. The majority of these box trainers introduce surgical instruments into the visual field of the smartphone or tablet though holes in a cardboard enclosure or holes in plastic discs integrated with the box trainer enclosure.

All the box trainers discussed above also have the following limitations. They all entail a very limited surgical field. This means that surgical tasks can only be performed on physical models or very small animal models. Additionally, the instruments as used in the box trainers have a greatly reduced range of motion and in many cases limited degrees of freedom to move. The smartphone and tablets functioning as a laparoscope surrogate and/or external monitor are also in a fixed position. Thus, the surgical field cannot be moved, which is a problem since laparoscope movement in conjunction with instrument movement is an important surgical coordination task but also the fixed nature of the surgical field limits the size of the models that can be used for surgical tasks. Also, because of the symmetric design of current box simulator instrument holders and the eccentric placement of the camera on third party devices, such as tablet computers and smartphones, instrument spacing in the visual field of the simulator is not representative of a real surgical scenario. Finally, surgical instruments cannot be placed through trocars in any of the current box simulators.

SUMMARY OF THE INVENTION

Embodiments of the current invention can be used with a cell phone, smartphone, tablet, and mini-tablet computer. The instrument holders used with these devices in most embodiments are not symmetrically designed to permit realistic spacing in the surgical field especially when viewed on an external monitor. For example, embodiments of this invention often include a right instrument holder arm that is longer and bent along its longitudinal axis because the camera location on the smartphone, tablet or mini-tablet computer functioning as a surrogate laparoscope is in the upper left corner of these devices. In some embodiments the instrument holders also terminate in ball joints permitting free motion simultaneously in two planes. Also, the hole in the ball joint in which the surgical instrument is inserted has a sufficiently large diameter that vertical displacement and free rotation of surgical instruments about the surgical instrument shaft is permitted as well as insertion through trocars. This significantly enhances the surgical instrument range and freedom of motion approaching that of a real surgical scenario as compared with current box trainers. In some embodiments the internal camera acting as a laparoscope can be moved in conjunction with or independent of surgical instrument motion as compared with fixed locations on current box trainers. This also allows a greatly enlarged surgical field permitting surgical training tasks to be performed on large animals, as well as improved realism and simulation of hand-eye coordination skills required in actual laparoscopic and other minimally invasive surgeries.

In some embodiments, the smartphone, tablet of mini-tablet computer is fixed on a gimbaled central platform within a nest of two concentric gimbal rings attached to a support frame. The nested gimbal rings pivot and freely rotate about all three orthogonal axes of the central platform. The stylus of the smartphone, tablet, or mini-tablet computer is held in a fixed position over the smartphone, tablet, or mini-tablet computer. Motion of the stylus and the associated movement of the smartphone, tablet, or mini-tablet computer causes rotations about these axes. The three-axis accelerometer internal to most smartphones, tablets, or mini-tablet computers fixed on the central platform detects these movements and are streamed and displayed to an external monitor. Apps can also be downloaded to the smartphone, tablet, or mini-tablet computer permitting games to be played using the stylus as a controller that promote development of relevant hand-eye coordination skills in various minimally invasive surgical scenarios and entertainment game scenarios. In some embodiments the eyepiece assembly is from an endoscope, gastroscope, colonoscope, bronchoscope, laparoscope, or real surgical tool adapter that a gastrointestinal clinician or surgeon manipulates can replace the stylus above.

Streaming various VR surgical scenarios to an external monitor then permits simulation of various endoscopic and minimally invasive surgical procedures.

BRIEF DESCRIPTION OF THE DRAWINGS

Embodiments are illustrated as examples and do not connote limitations in the figures of the accompanying drawings. There are five embodiments of the subject invention illustrated in the accompanying drawings—FIGS. 1 through 15.

The first embodiment of the subject invention is shown in FIG. 1.

The left and right arms, 112 and 115, of the laparoscopic instrument holders are shown in FIG. 2.

The left and right instrument holders at the distal ends of their arms have plates 109 and 103, respectively, with embedded ball joints, 110 and 104 shown in FIG. 3.

Figure 4:
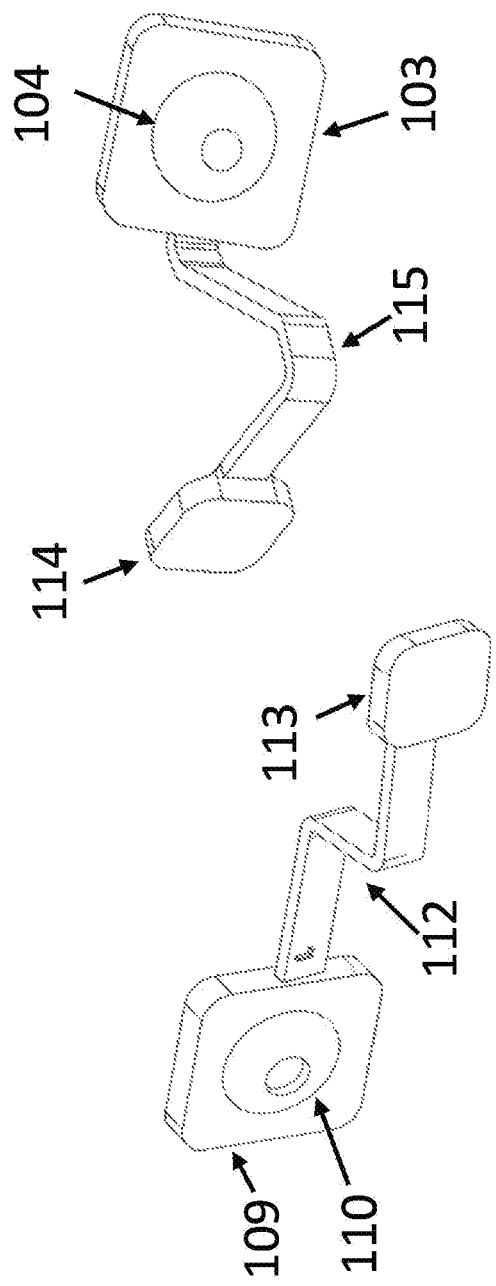

The assembled instrument holders with embedded ball joints are shown in FIG. 4. Laparoscopic instruments, 102 and 108 (FIG. 1), are inserted through holes in the ball joints, 110 and 104. This permits the surgical tool to be rotated about its axis, control depth of penetration, and displace the tip of the tool in the visual field of the camera, vertically and horizontally, by employing an appropriate displacement of the ball joint.

Figure 5:
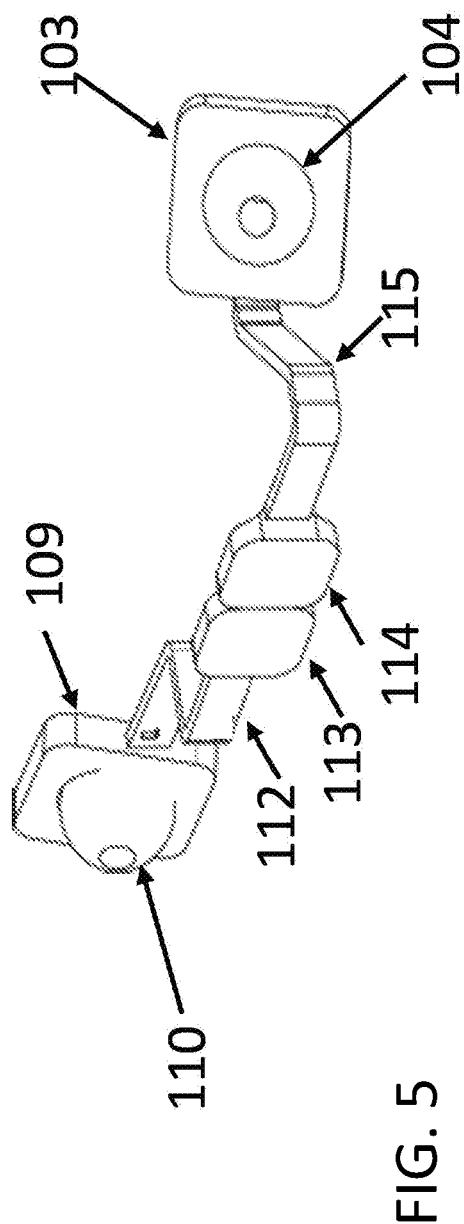

A second embodiment of the assembled instrument holders is shown in FIG. 5 where plates, 113 and 114 are joined along their proximal edges or manufactured as one piece. In this embodiment the connected plates, 113 and 114, of the instrument holders form a flat surface for use as a platform for the attachment of a smartphone, 105, tablet or mini-tablet computer.

Figure 6:
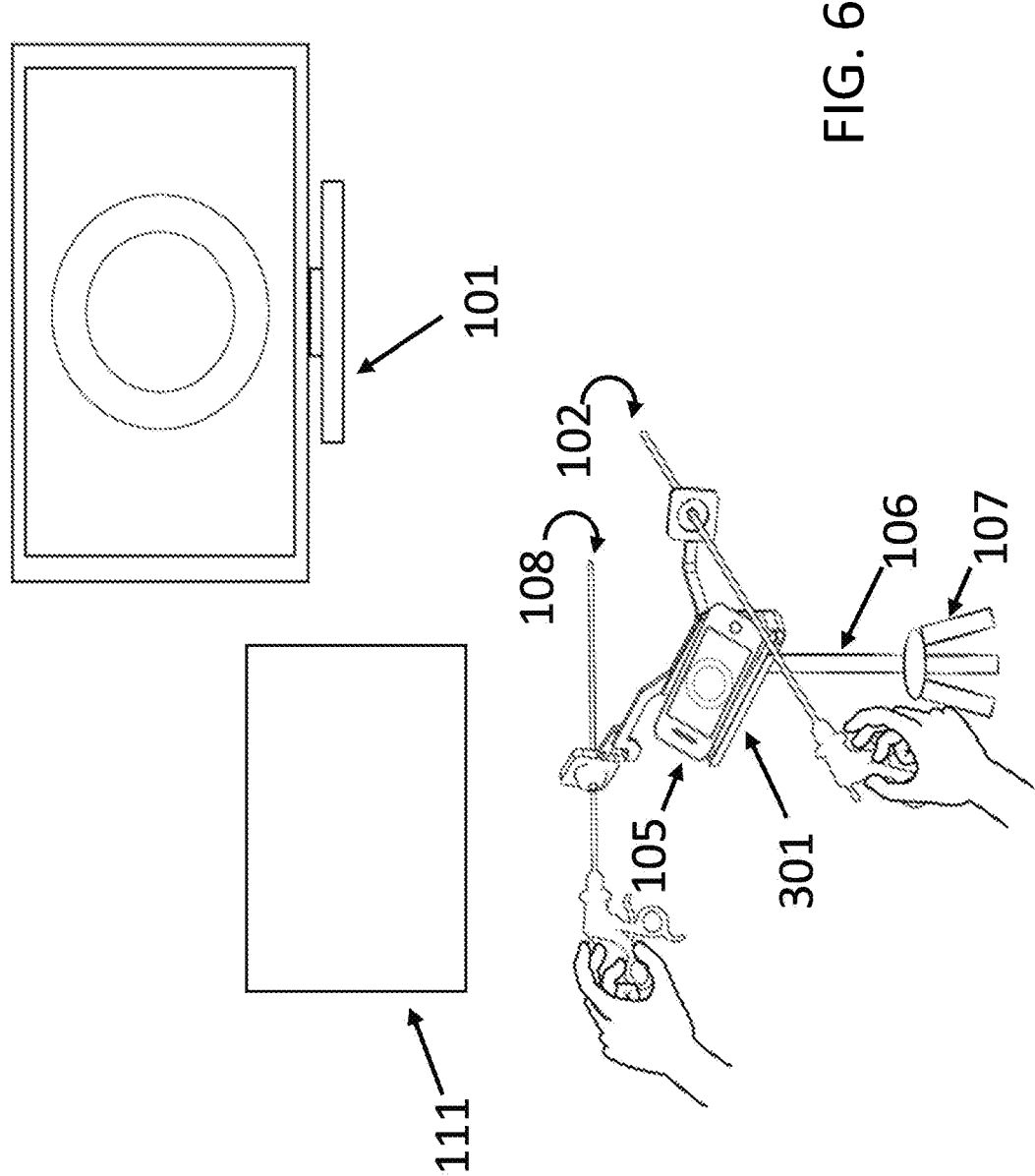

FIG. 6 shows a third embodiment of the laparoscopic surgical system where a smart phone case holder, 301, with integrated instrument holders is employed.

Figure 7:
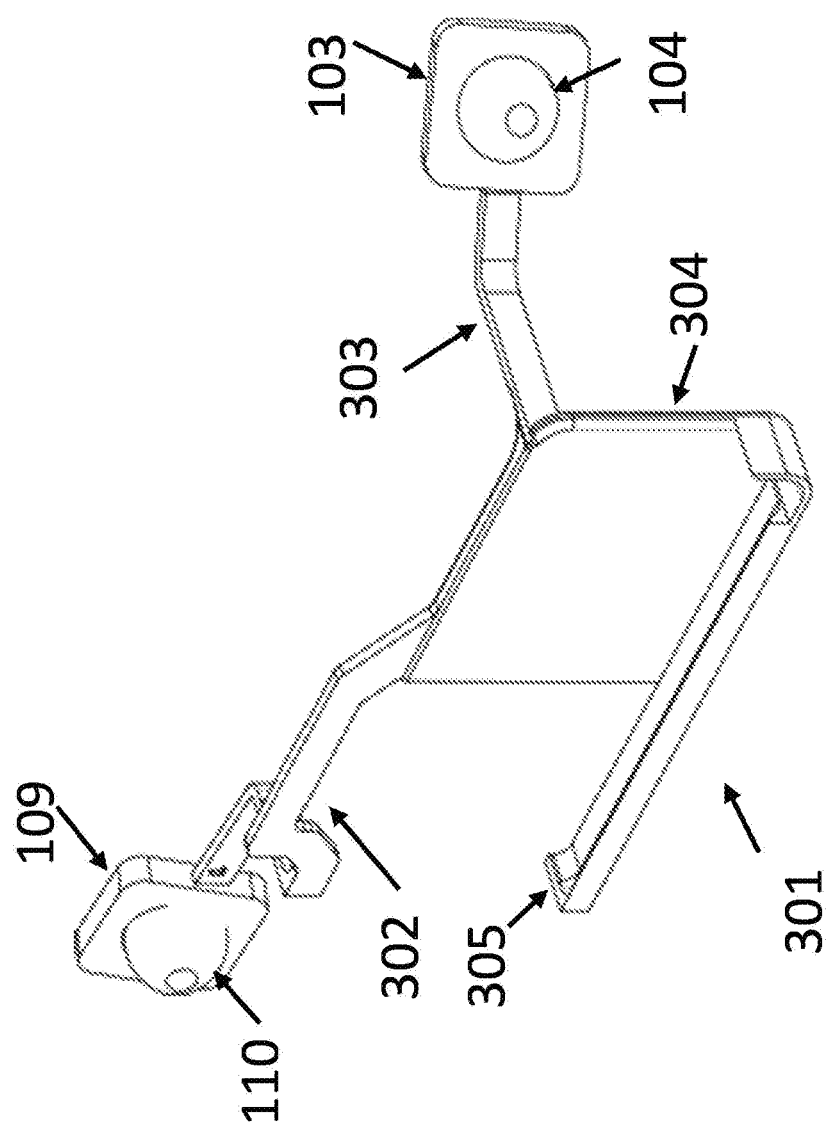

FIG. 7 shows the assembled case holder, 301, with instrument holder arms, 302 and 303, attached to the plate 304 of said case holder, 301. The dimensions of the case holder, 301, could also be scaled with larger dimensions to accommodate the larger form factor of a tablet or mini-tablet computer.

Figure 8:
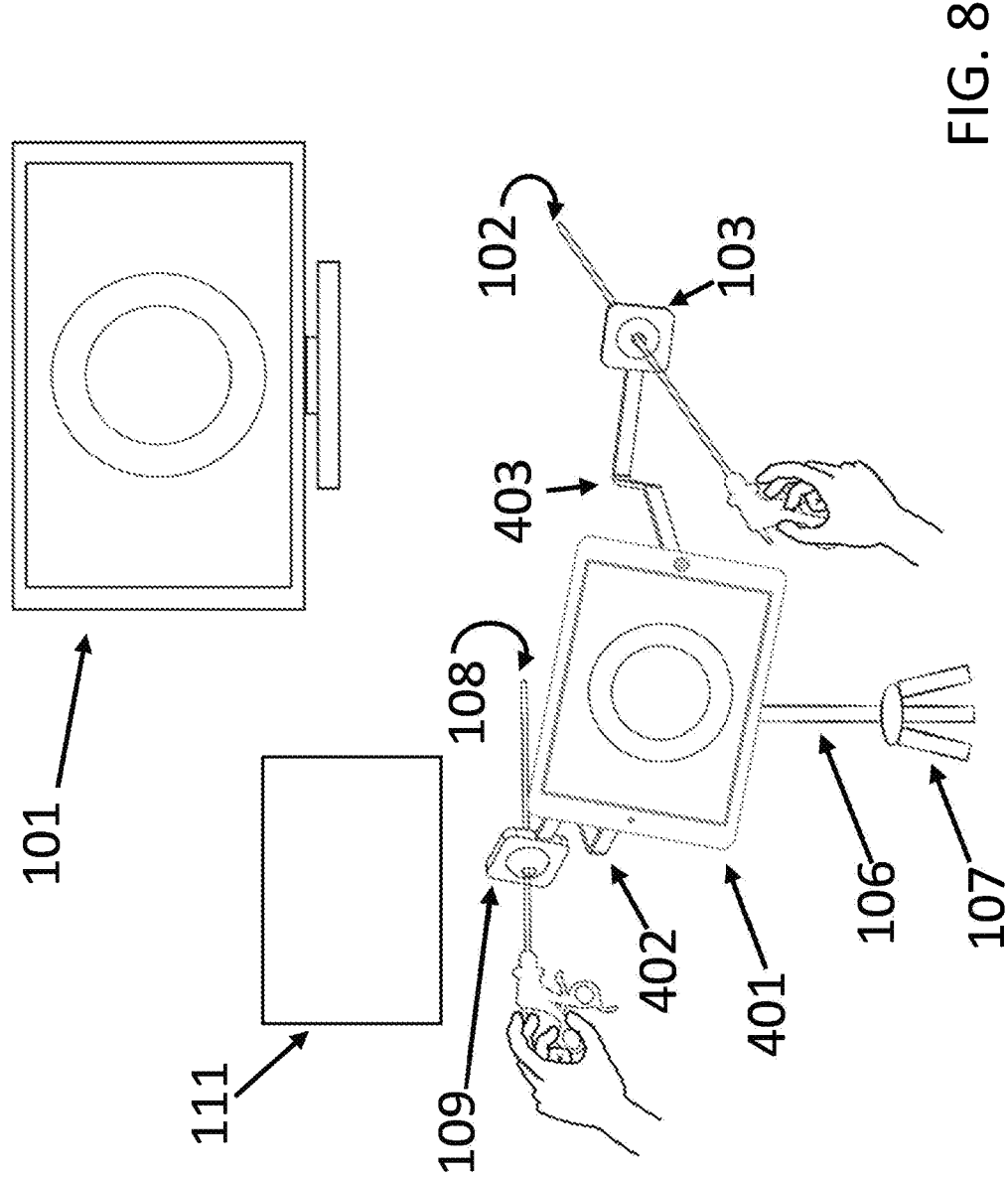

FIG. 8 shows another embodiment of the surgical simulation and training system integrated with a tablet, or mini-tablet computer, 401.

Figure 1:
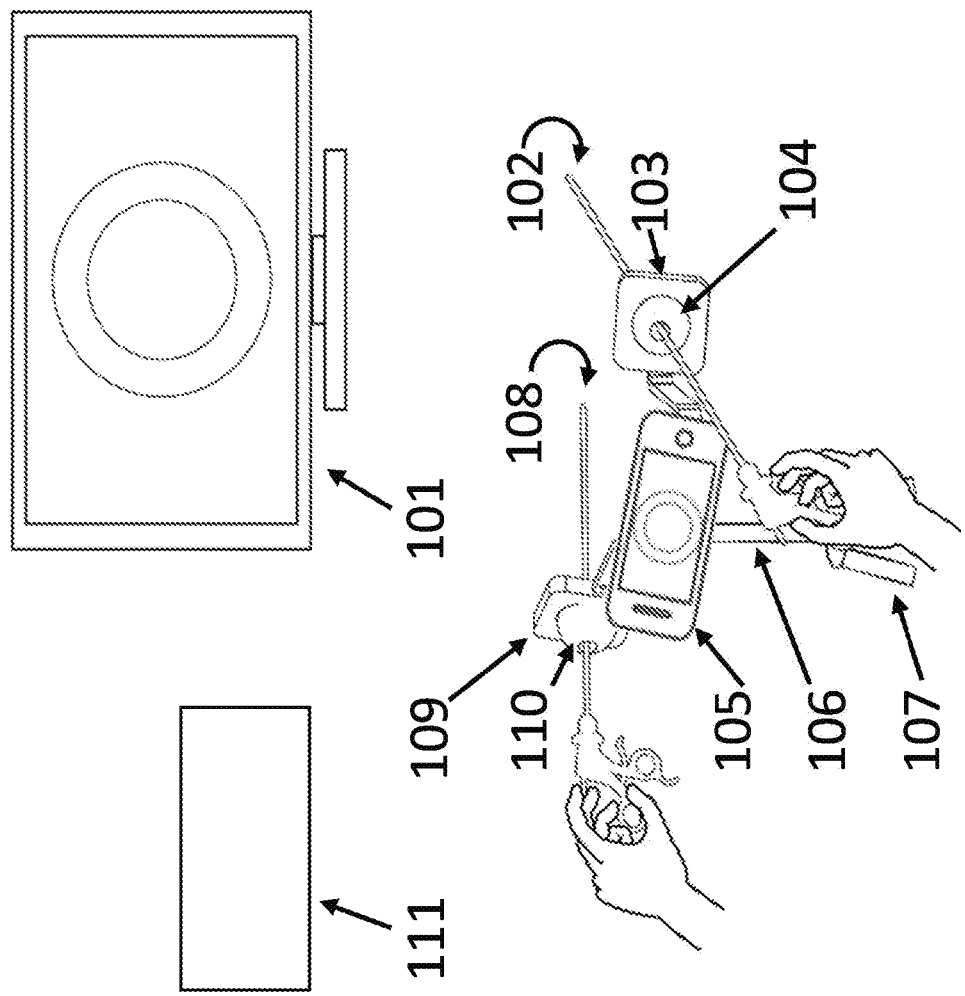
FIG. 1 presents a system view of this first embodiment of the Laparoscopic Surgical Simulation and Training System. Detail 101 shows a monitor with a display, which could be a television. Detail 111 shows a wireless device connecting the monitor 101 to a smartphone 105. Detail 105 however could also be a tablet computer or mini-tablet computer. The connection between the monitor 101 and the device 105 could be a direct wired connection or wireless connection. Detail 111 is not necessary if a directly wired connection is used to connect 105 to 101. An example of a device 111 used for a wireless connection between 105 and 101 could be Apple TV® if the monitor 101 was a television. Left and right laparoscopic tools are shown as details 108 and 102, respectively. A stand, shown as a tripod in FIGS. 1, 6 and 8, with feet 107 and a stationary fixed axis, 106, provides stability and a stationary position for the device 105 and associated laparoscopic instrument holders. This stand however could be any commercial "off-the shelf" stable platform.
Figure 9:
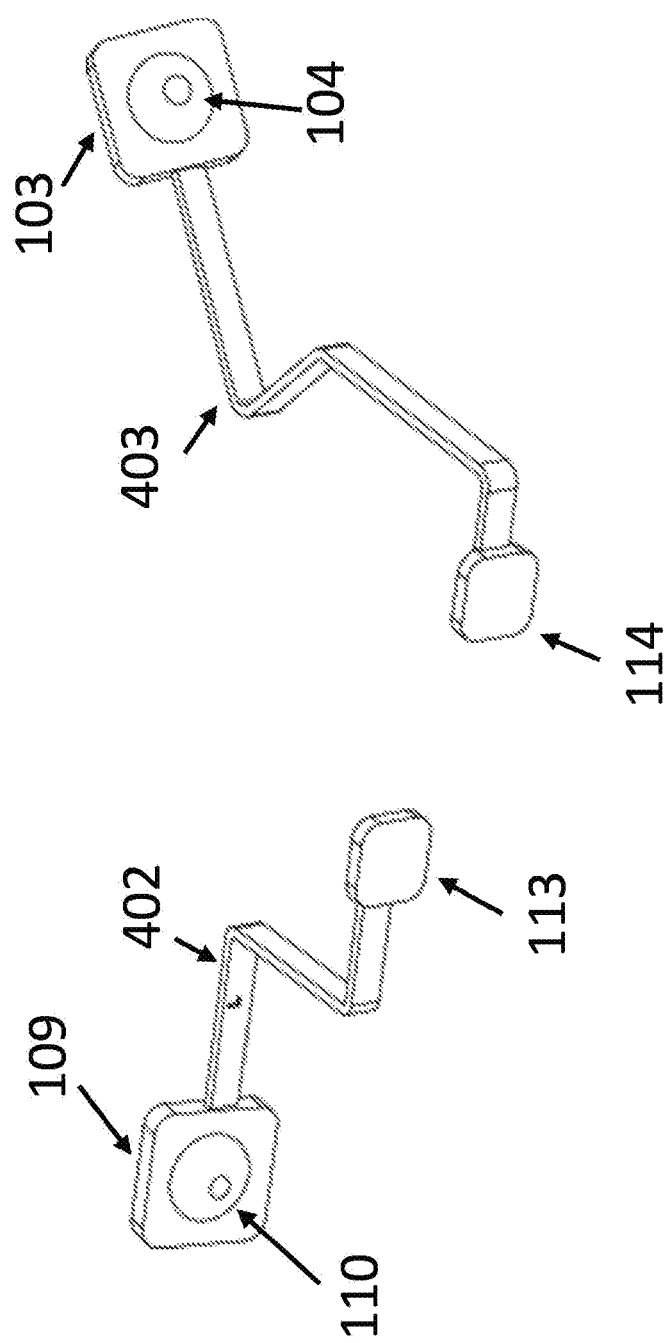

FIG. 9 shows the assembled laparoscopic instrument holders with longer arms to accommodate the larger size of the tablet or mini-tablet computer as compared with a smartphone, 105, shown in FIGS. 1 and 6. Plates 113 and 114 located proximal on the instrument holder arms, 402 and 403, are attached securely to the tablet or mini-tablet case but could also be attached to an assembly 301, as shown in FIGS. 6 and 7, scaled appropriately to accommodate the larger form factor of a tablet or mini-tablet computer.

Figure 10:
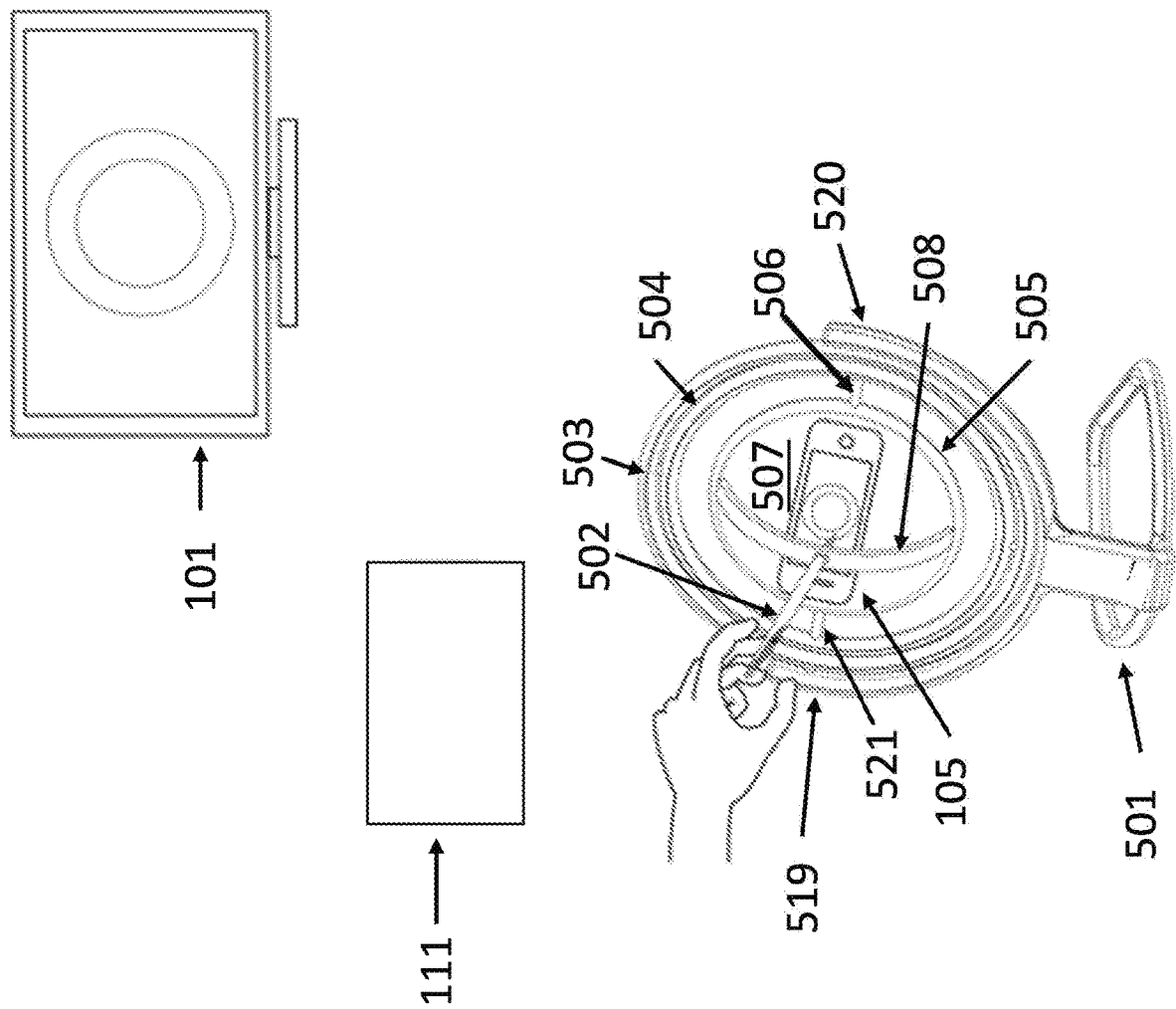

Another embodiment of this invention is shown in FIG. 10. FIG. 10 shows a surgical system for simulation and training incorporating a set of three nested, concentric gimbal rings attached to a stationary support structure, 501, with a semicircular support frame with a left half, 519, and a right half, 520, shown in FIGS. 10, 11, and 12. The set of concentric nested rings, 503, and 504, and central support platform, 505, for the smartphone, 105, have orthogonal pivot axes.

Figure 11:
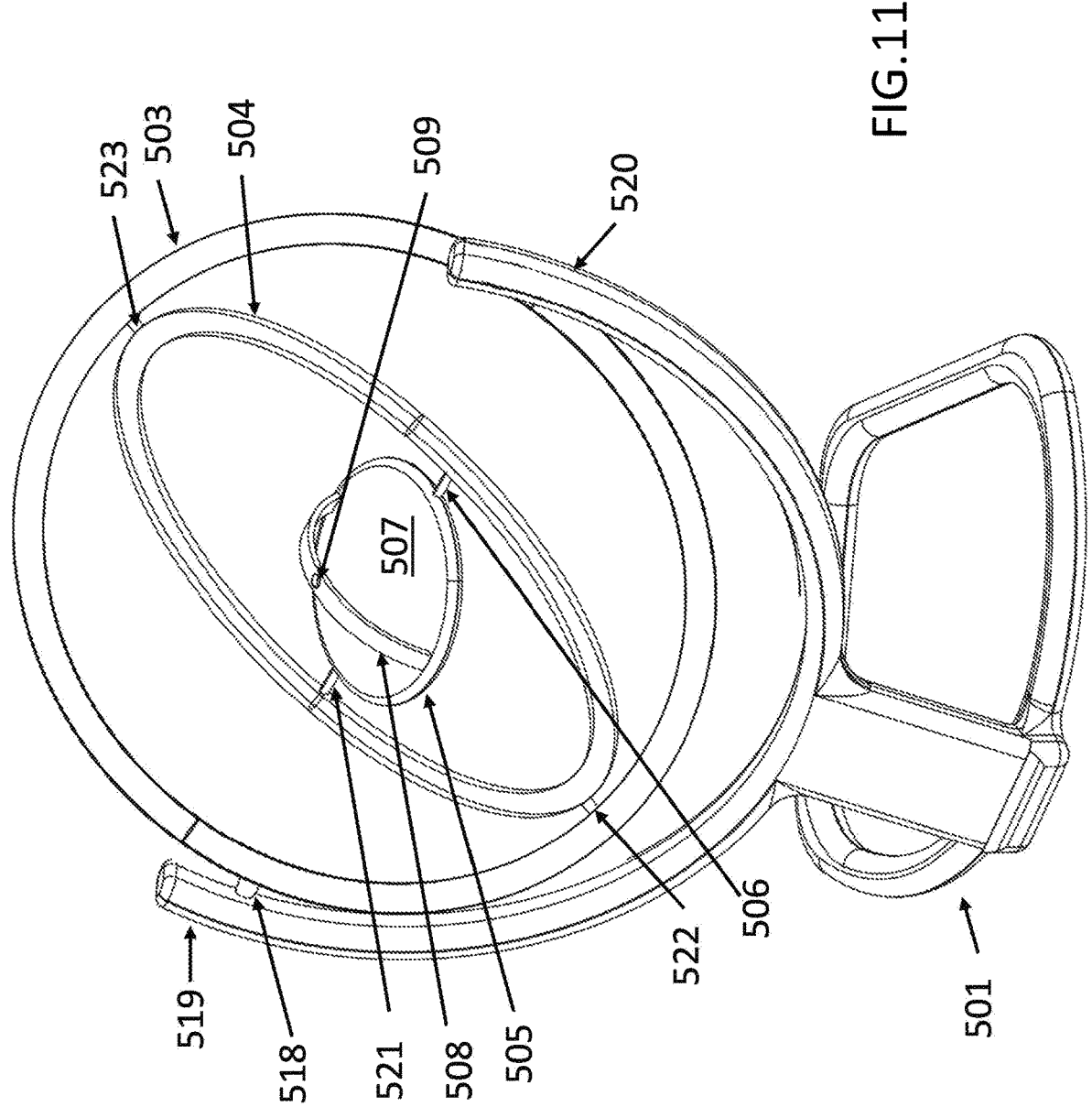
Figure 12:
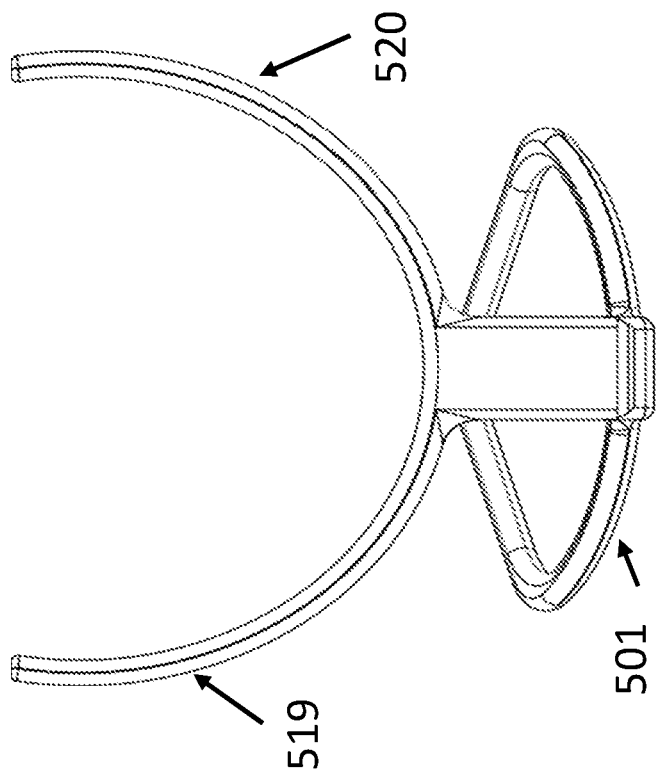
Figure 15:
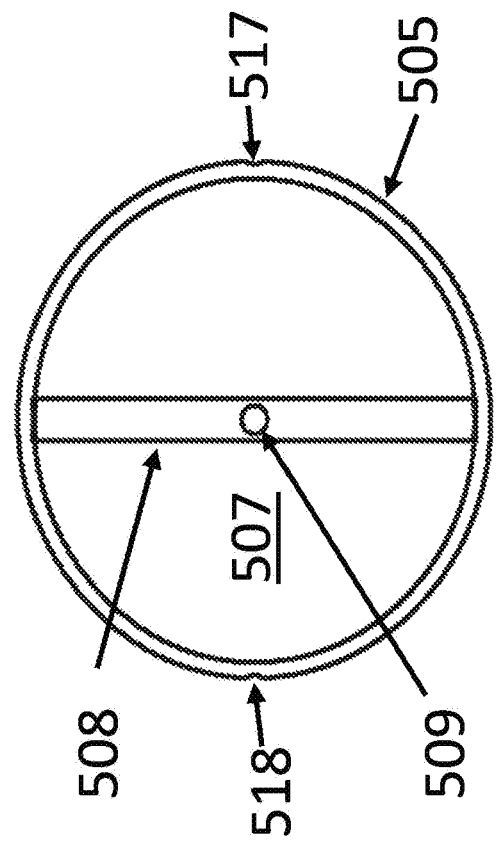

The stylus, 502, in FIG. 10, or eyepiece assembly of a lapraroscope, endoscope, gastroscope, colonoscope, or bronchoscope is inserted into a hole, 509, shown in FIG. 11 and in the plan view of the central platform, 505, shown in FIG. 15. This hole is on the center of a semicircular arch structure, 508, spanning the front facing surface, 507, of the central circular platform or annulus, 505, concentric with the gimbal rings 503 and 504 and semicircular support frame with halves, 519 and 520. Although a smartphone, 105, is shown for the embodiment in FIG. 10, the dimensions of the rings, 503 and 504, support structure, 501, 519, and 520, and central platform, 505, and arch, 508, over the platform, 505, could easily be scaled to accommodate the larger form factor of a tablet or mini-tablet computer.

Motion of the stylus, 502, or alternatively an aforementioned surgical scope, mounted over the smartphone, 105, tablet or mini-tablet computer, causes rotational displacements about the orthogonal axis of the concentric gimbal rings, 503 and 504, and the concentric central platform, 505. The rotational displacements are sensed by an independent three-axis accelerometer mounted on the central support platform, 505, or a three-axis accelerometer internal to a smartphone, 105, in FIG. 10, tablet or mini-tablet computer.

Figure 13:
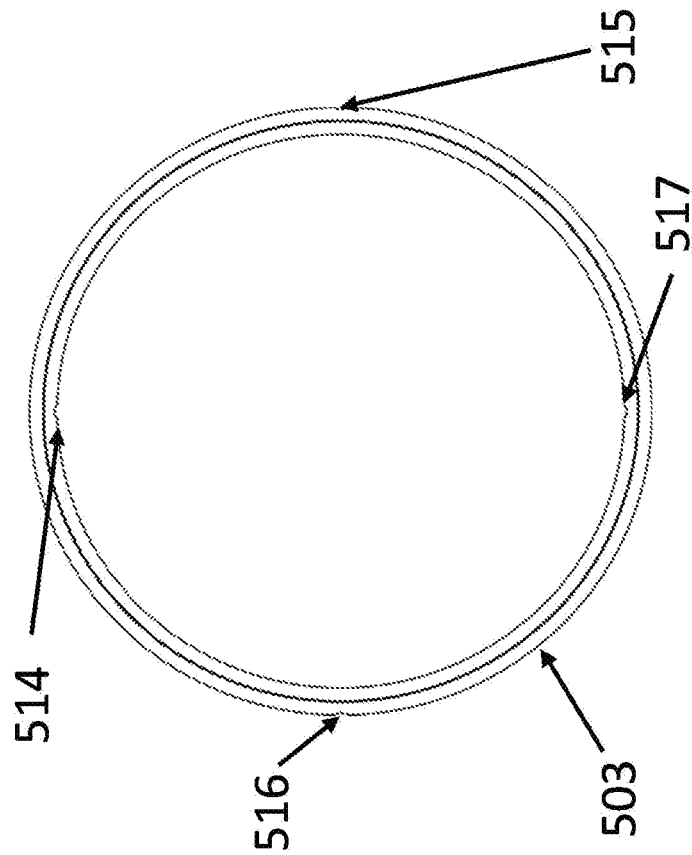

The semicircular portion of the support frame, 519, is connected to the outer gimbal ring, 503 with shaft, 518, shown in FIG. 11 The opposite half of the support structure, 520, is connected to the outer gimbal ring, 503, with a similar shaft co-linear and aligned with 518. The shaft, 518, in FIG. 11 is connected to a hole or bushing shown as detail 516 in FIG. 13 and a complementary hole or bushing on 519 in FIG. 12. Detail 515 shown in FIG. 13 represents another hole or bushing connecting a similar shaft to a complementary hole or bushing on 520 in FIG. 12. The two co-linear and aligned shafts connecting 503 to the semicircular regions of the support structure, 519 and 520, permit rotation of 503 about a single axis established by the two aforementioned shafts. This axis hereinafter will be referred to as the "roll axis." This roll axis defined by these two co-liner and aligned shafts are parallel to the "ground plane" established by the support base, 501, in FIG. 12.

Figure 14:
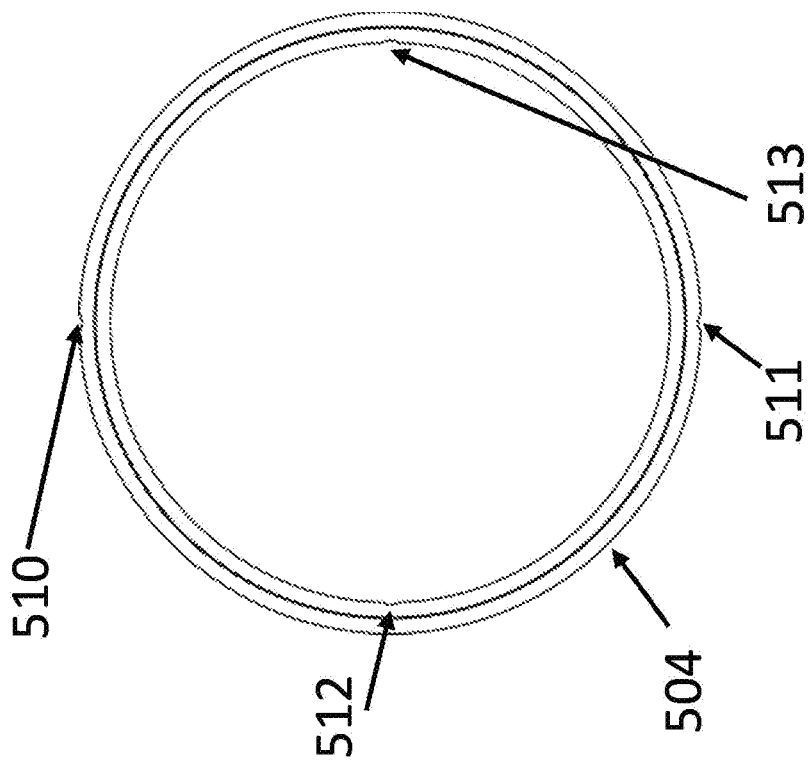

The outer gimbal ring, 503, is also connected to the inner gimbal ring, 504, using two short shafts, 522 and 523, shown in FIG. 11 connecting 514 in FIGS. 13 to 510 in FIGS. 14 and 517 in FIGS. 13 to 511 in FIG. 14. Both shafts connecting 503 to 504 are aligned and co-linear and permit rotation of the inner ring, 504 about a single axis defined by the alignment of the two shafts connecting 503 to 504. This axis is orthogonal to the roll axis defined by 518. This axis hereinafter will be referred to as the "yaw axis."

A smartphone, 105, tablet or mini-tablet computer is securely mounted on the innermost gimbaled platform, 505, shown in isometric views in FIGS. 10, 11, and in plan view in FIG. 15. The circular platform, 505, can be a disc or annular structure that is concentric with the semi-circular support structure, 519 and 520, and outer and inner gimbal rings, 503 and 504, respectively.

The circular platform, 505, has two holes or bushings, 518 and 517 in FIG. 15. The inner gimbal ring, 504, is connected to the platform, 505, using two shafts 506 and 521, shown in FIGS. 10 and 11. The shaft 521 is connected to a hole or bushing, 512, on 504 in FIG. 14 and a hole or bushing, 518 in FIG. 15. The shaft, 506, is connected to a hole or bushing, 513, on 504 in FIG. 14 and a hole or bushing, 517 in FIG. 15. The two shafts, 506 and 521, connecting 504 to 505 are aligned and co-linear establishing a single axis of rotation of 505 with respect to 504. This axis of rotation is orthogonal to the aforementioned yaw and roll axis and will henceforth be referred to as the "pitch" axis.

A semi-circular arc structure, 508, in FIGS. 11 and 15, spans the front surface, 507, of the platform, 505, and is fixed to 505 so it remains stationary with respect to 505. A stylus, 502 (FIG. 10), is inserted in a hole, 509 (see FIGS. 11 and 15) in the semi-circular arc structure, 508. Alternatively, the eyepiece assembly of a surgical scope, such as an endoscope, laparoscope, colonoscope, gastroscope, or bronchoscope could be used in place of the stylus depicted in FIG. 10.

Motion imposed by the user on the stylus, 502, or surgical eyepiece assembly imposes rotational displacements about the roll, yaw, and pitch axes of the central platform, 505, and the nested gimbal rings, 503 and 504. These displacements are detected by the three-axis accelerometer internal to the smartphone, tablet, or mini-tablet computer and mounted on the central platform, 505. Alternatively, an independent accelerometer can be mounted on 505 for this purpose. Output from the three-axis accelerometer used independently or internally in a smartphone, tablet, or mini-tablet computer results in inducing motion of an icon or virtual surgical instrument on the monitor, 101, or 105 device as the concentric gimbals produce roll, yaw, and pitch displacements. The device 105 and the display 101 are connected wirelessly using a device 111 or wired directly. By example, if 101 is a television and connected wirelessly to an IPhone®, 111 could be Apple TV®. If 105 is wired directly to 101, then 111 is not necessary.

DETAILED DESCRIPTION OF THE INVENTION

Disclosed herein are five embodiments of the subject invention. These embodiments are illustrated as examples and do not connote limitations in the figures or the narrative description of the examples or the accompanying drawings. All dimensions discussed for each example represent a tested prototype and are included for pedagogic purposes to those skilled in the art as an application of the inventive disclosure but are no means meant to be limiting.

Various embodiments of laparoscopic instrument holders used in a surgical simulation system are described in examples one through five described below. Example 5 consisting of nested gimbal rings, can be further used for simulation of endoscopic, colonoscopic, gastroscopic, and brochoscopic minimally invasive surgical procedures when used with eyepiece assemblies typical of the aforementioned surgical scopes. The smartphone, tablet, or mini-tablet computer in example 5, can also be used with downloadable applications ("apps") or "games" that promote development of hand-eye coordination skills when used with a stylus.

EXAMPLES

Example 1

Surgical Simulation and Training System with Laparoscopic Instrument Holders Integrated with Smartphone (see FIGS. 1, 2, 3 and 4). A unique feature of this embodiment are the design of the laparoscopic instrument holders shown in FIG. 4. These holders can accommodate any smartphone case and consist of a separate left and right arm, 112 and 115, respectively.

The shape and dimensions of the instrument holder arms, 112 and 115, are necessarily different. Each arm has a distal and a proximal end. The distal end of each arm terminates in a ball joint, 110 and 104. The proximal end of each arm is attached to the case of the smartphone, 105, in FIG. 1. The shape and dimensions of the arms, 112 and 115, however are different because the camera internal to a smartphone, 105, is typically eccentrically located on the rear surface of the smartphone. Often the internal smartphone camera is located in the upper left hand corner. Thus, the right arm, 115, must be longer to preserve spacing of surgical instrument tips that are representative of a real surgical scenario. This spacing is nominally 10 cm so the right arm, 115, in order to be closer to the surgical field for a camera eccentrically located on the upper left corner on the rear of the smartphone, must be longer and angled inward toward the surgical field, relative to the left instrument holder arm, 112. Laparoscopic instruments, 108 and 102 in FIG. 1, are inserted in the ball joints, 110 and 104, at the distal terminus of the arms 112 and 115. These instruments, 108 and 102, are grasped by the left and right hands of the surgeon, respectively.

When the laparoscopic instrument holders are attached to the smartphone case, the smartphone camera can then function as a surrogate laparoscope focused on the surgical field and streamed to an external monitor, 101 in FIG. 1 in "real-time" (i.e., without apparent latency in the video streaming). The integrated surgical simulation and training system then consists of laparoscopic instruments, 108 and 102, inserted through the ball joints, 110 and 104, at the distal terminus of the aforementioned laparoscopic instrument holders, and attached to a smartphone case, and where "real-time" video images from the internal camera of said case are streamed to an external monitor 101. Once the instrument holders have been attached to the phone case, the distance between distal ends of the surgical instruments (that is the end of the surgical instrument in the surgical field) should be approximately 10 cm representative of a real laparoscopic surgical scenario. The instrument holders, 112 and 115, in this embodiment are separate so the user can locate and position the arms according his needs and the specific design of the smartphone and rear-facing smartphone camera location.

The remaining text in the description of this example will discuss the specific dimensions and design of the prototype arms that were used and tested by the inventor. These dimensions are for illustrative purposes only and should not be construed as connoting any limitations. They are merely provided for pedagogic purposes to instruct someone skilled in the art as to an application of the disclosed invention.

The left instrument arm consisting of 109, 110, 112, and 113 (FIG. 4) was 143.86 mm long. The left instrument holder arm, 112, was 10 mm wide and 3 mm thick. When injection molded from an appropriate plastic resin, the mechanical stiffness of the instrument holder arms was sufficiently rigid to hold and manipulate the laparoscopic instrument inserted through the respective ball joints, 104 and 110, located at the distal end of each arm, 112 and 115. The proximal end of each instrument holder arm, 112 and 115, had a 25 mm$^2$ square and approximately 8 mm thick planar surface, 113 and 114, that was attached to smartphone case and provided sufficient stability when laparoscopic instruments were used to perform surgical maneuvers with the surgeon's left hand.

Distal to the to this smartphone attachment plate 113, along the left arm, 112, there was a 90 degree step in the arm located 34.93 mm distal to the plate 113 distal boundary. The step was proceeded and followed by bends in the arm, 112, with a 4.0 mm radius. These bends mitigated stress risers when the arms are manipulated but also correctly position the arm segment distal to this step. Because of these bends, the 44.23 mm arm segment distal to the step was actually at a subtended angle of 95 degrees. Distal to this arm segment was a 7.20 mm thick, square planar surface, 109, with rounded edges that was 40 mm$^2$ that forms the distal terminus of this instrument holder. This distal terminal plate, 109, had a spherical space with a 31.2 mm radius to accommodate placement of a ball joint, 110. In the center of the ball joint was an 8.20 mm diameter hole where a surgical port was introduced and laparoscopic instruments with a nominal 5 mm diameter shaft were inserted. There was sufficient play between the 5 mm diameter instrument shaft and 8.2 mm hole in which the instrument is inserted that the surgical instrument could be displaced along its longitudinal axis to permit varying depths of penetration in the surgical field as well as rotation about the surgical instrument shaft. The ball joint also permitted displacements along two orthogonal axes in the plane of the distal terminal plate, 110.

The right arm, 115, is also 10 mm wide and 3 mm thick with a total length of 116.17 mm with three bends approximating the shape of an "S" because it must be closer to surgical field due to the eccentric location of the rear-facing, internal smartphone camera. At the proximal end of the right arm, 115, there is an 8 mm thick, 25 mm$^2$ square plate, 114, that attaches to the smartphone, 105. Distal to this smartphone attachment plate, 114, along the right arm, 115, there is a 90 degree step in the arm located 33.79 mm distal to the plate 114, boundary. The longitudinal axis of the arm segment distal to this step is 51.17 mm in length and angled 135 degrees with respect to the longitudinal axis of the right arm proximal to the 90 degree step. Again there is another bend at the distal end of the right arm so that the plane of the distal terminal plate, 103, is at a 145 degree angle with respect to the longitudinal axis of the right arm segment attached to this terminal plate. The design of this terminal plate, 103, and associated ball joint, 104, is identical to the same elements, i.e., 109 and 110, in the left instrument holder arm.

Example 2

Surgical Simulation and Training System with "Joined" Laparoscopic Instrument Holders Integrated with Smartphone (see FIG. 5). The only difference between the previous example with separate right and left instrument holders and this example, is that the proximal terminal plates, 113 and 114, are fixed at their proximal edges or can be manufactured as one piece. This gives enhanced stability at the smartphone attachment point to the arms and maintains the same distance between distal ends of instrument holder arms. One advantage of this model is that the user can install the smartphone quickly without adjusting the arms since the distance between distal ends of the instrument holders are maintained.

Example 3

Surgical Simulation and Training System with Laparoscopic Instrument Holders Integrated with Smartphone, and Smartphone Case Holder (see FIGS. 6 and 7). This embodiment includes a universal smartphone case, 301, in FIGS. 6 and 7, that can accommodate any sized smartphone, with attached right and left instrument holders. The phone case, 301, as tested, was rectangular and 164.94 mm long, defined by detail 305, and 76 mm high, defined by detail 304, to accommodate the largest smartphones currently available. The instrument holders in FIG. 7, had a fixed distance between the ball joint centerlines of. 248.81 mm. However, the smartphone case was be mounted on a commercially available portable stand such as the tripod, 106 and 107, shown in FIG. 6, so that the initial position and location of the distal tips of laparoscopic surgical tools in the surgical field were prescribed to the nominal 10 cm.

The arm of the left instrument holder, 302, was 148.81 mm long, along the longitudinal axis of the arm, 10 mm wide and 3 mm thick, and could be divided into at least four sections, not including the distal plate, 109, with the ball joint, 110. There was a 69.94 mm section parallel to the phone case holder length and horizontal with respect to the ground plane. The proximal end of this section was attached to a diagonal section that rose vertically a distance of 9.02 mm over the left corner of the smartphone case, detail 304. This permitted the camera to record video or photos. The distal end of this 69.94 mm section had a third section that was 34.01 mm in length and was at right angles, perpendicular to the plane of this 69.94 section. The fourth section of the left arm, 302, was another 42.34 mm segment at 95 degrees to the longitudinal axis of the 34.01 mm segment and distal to the 34.01 mm segment. Distal to the 42.34 mm segment was the terminal plate, 110, and ball joint, 109. The design of 110 and 109 as well as the configuration of the associated laparoscopic instruments was identical to the first three examples.

The right arm, 303, in this example has a 53.40 mm segment normal to the plate 304 as depicted in FIG. 7. There is a another 25.99 mm segment distal to the 53.40 mm segment where the longitudinal axis of this segment and the previous right arm segment subtends an angle of 135 degrees. The geometry of the left and right instrument arms, 302 and 303, permit a much larger surgical field then would be possible with current box trainers and allows laparoscopic procedures to be performed on larger animal models.

Example 4

Surgical Simulation and Training System with Laparoscopic Instrument Holders Integrated with a Tablet Computer (see FIGS. 8 and 9). The left and right arms, 402 and 403, respectively, of the separate left and right instrument holders in this example were similar to the instrument holders in example 1. However, the tablet or mini-tablet computer, 401, in FIG. 8, had a larger form factor than the smartphone, 105, in the previous examples. Because of the larger form factor of 401 relative to 105, the distance between attachment points of the instrument holders on the 401 case was larger than the distance between the left and right instrument holders in example 1. As a consequence, the instrument holders in this example were necessarily longer than the respective instrument holders in example 1 and the distance between 401 and the target tissues and organs of the animal models that 401 images in the surgical field were father than the corresponding distance in example 1.

The arm, 402, of the left instrument holder measured along its longitudinal axis was 212.37 mm long, 10 mm wide, and 3 mm thick. The arm, 402, terminates proximally in a 7.82 mm thick, 40.14 $mm^2$ square planar surface, 113, which is attached to the tablet or mini-tablet computer holder providing stability when laparoscopic instruments are manipulated with the surgeon's left hand. As in previous examples, the distal terminus of this arm is a planar surface 109 and ball joint, 110. Laparoscopic instruments are inserted in to the ball joints as in previous examples.

The arm, 402, of this left instrument holder had two 90 degree bends giving a "Z" like shape to this arm as shown in FIG. 9. The location of the first bend was 54.63 mm distal to the planar surface, 109, edge where the arm 402 was attached. Distal to the first bend closest to the planar terminus 109, there was a 62.97 mm arm segment perpendicular to aforementioned 54.63 mm segment. Distal to this 62.07 mm segment there was another 54.63 mm segment perpendicular to the aforementioned 62.97 mm segment which formed a lap joint with planar surface 113. The design of this arm provided increased access to the left surgical field by laparoscopic instruments as compared with current box trainers.

The arm, 403, of this right instrument holder was 249.26 mm as measured along the longitudinal axis of 403 and has three bends rendering an "S" shape as shown in FIG. 9. The shape of this arm was dictated by the need to be closer to surgical field given the eccentric location of the internal camera in 401. The arm, 403, terminated proximally forming a lap joint with a planar surface, 114. The design of 114 was identical to the corresponding surface 113. Both 113 and 114 are attachment to the 401 case. Distal to this proximal planar surface was a short segment at a 90 degree bend leading to 91.46 mm long segment. Distal to this 91.46 mm segment there was another short segment at 135 degrees relative to the previous 91.46 mm segment. There was then another 67.54 mm segment at 145 degrees relative to the previous short segment. The shape and increased length of this instrument holder preserved the nominal 10 cm spacing of laparoscopic surgical tips in the surgical field given the eccentric location (upper left corner) of the rear facing internal camera in 401.

Example 5

Concentric Nested Gimbal Ring Surgical Simulation and Training System Integrated with a Smartphone (see FIGS. 10 through 15). Example 5 describes another embodiment of this invention shown in FIG. 10. FIG. 10 shows a surgical system for simulation and training incorporating a set of three nested, concentric gimbal rings attached to a stationary support structure, 501, with a semicircular support frame with a left half, 519, and a right half, 520, shown in FIGS. 10, 11, and 12. The set of concentric nested rings, 503, and 504, and central support platform, 505, for the smartphone, 105, have orthogonal pivot axes.

Motion imposed by the user on the stylus, 502, or surgical eyepiece assembly imposes rotational displacements about the roll, yaw, and pitch axes of the central platform, 505, and the nested gimbal rings, 503 and 504. These displacements are detected by the three-axis accelerometer internal to the smartphone, tablet, or mini-tablet computer and mounted on the central platform, 505. Alternatively, an independent accelerometer can be mounted on 505 for this purpose. Output from the three-axis accelerometer used independently or internally in a smartphone, tablet, or mini-tablet computer results in inducing motion of an icon or virtual surgical instrument on the monitor, 101, or 105 device as the concentric gimbals produce roll, yaw, and pitch displacements.

In this particular example, a smart phone was mounted on the central support platform, 505. The central platform was 12.50 mm thick and circular with a 90 mm radius. The arch structure, 508, was 15 mm wide and 4.65 mm thick and was normal to the surface, 507. At the highest point of the arch, the arch was 46.79 mm normal to the surface 507. The central platform, 505, was sized in this example to accommodate a smartphone or mini-tablet computer. The hole, 509, had a 5 mm radius, sufficient to accommodate a stylus, or the eyepiece assembly of an endoscope, gastroscope, colonoscope, bronchoscope, laparoscope, or real surgical tool adapter as a controller; i.e., the device that the user displaces to induce apparent motion on an external monitor, 101.

The central platform, 505, was attached to the inner gimbal ring, 504, using a shaft 506 and 521, with a 5.83 mm shaft radius. This shaft established a single axis of rotation. The inner gimbal ring, 504, had a radius of 125 mm and a 12.50 mm width. The inner gimbal ring, 504, was separated from the outer gimbal ring, 503, by 2.50 mm and 503 had a radius of 140 mm. The outer gimbal ring, 503, was similarly separated from the semicircular support frame, 519 and 520, by 2.50 mm. Each concentric ring, 503, and 504, and the central support structure, 505, pivoted orthogonal to each other using shafts that had a 5.83 mm shaft radius. Each gimbal ring and the support structure were capable of freely rotating a full 360 degrees about the roll, yaw, and pitch axis as previously described.

The stand, 501, used in this example had a base with a segment parallel to the ground plane and a segment at a 65 degree angle from the base. The segment parallel to the ground plane was 12.50 mm thick and 184.87 mm deep as measured along the normal from the angled base and 235. mm wide. Attached to this angled segment was a semicircular support frame where the semicircle was concentric with the two gimbal rings, 503 and 504, and the circular central support structure, 505. The height of the semicircular support frame, 519 and 520, and attached base, 501, was 377.88 mm above the ground plane. The external diameter of the semicircular support frame, 519 and 520, was 310 mm. The 65 degree angle of the support frame was designed to simulate the tilt of the abdominal surface in a real surgical scenario.

Other Embodiments

The detailed descriptions set-forth above are provided to aid those skilled in the art in practicing the present disclosure. However, the disclosure described and claimed herein is not to be limited in scope by the specific embodiments herein disclosed because these embodiments are intended as illustration of several aspects of the disclosure. Any equivalent embodiments are intended to be within the scope of this disclosure. Indeed, various modifications of the disclosure in addition to those shown and described herein will become apparent to those skilled in the art from the foregoing description, which do not depart from the spirit or scope of the present inventive discovery. Such modifications are also intended to fall within the scope of the appended claims.

What is claimed is:

1. A surgical simulation and training system comprising:
a stationary base;
concentric nested rings supported by said stationary base; wherein individual rings comprising said concentric nested rings can each rotate about independently prescribed rotational axes of said each individual ring of said concentric nested rings;
a central support platform that is concentric with and is supported within said concentric nested rings; wherein
said central support platform supports has an attached device mounted to said central support platform; wherein said device registers time resolved displacements in real-time of user induced motion of said device attached to said central support platform; wherein
said device is chosen from the group consisting essentially of a smartphone, tablet computer, mini-tablet computer, and combinations thereof; wherein
said device is wirelessly connected to an external monitor that displays visual scenes from software applications executed in said device; wherein
said visual scenes are manipulated in said device in real-time by user induced motion of said device and mirrored in real-time on said external monitor; wherein
said central support platform and said attached device can rotate about a prescribed rotational axis; wherein
said stationary base remains stationary during motion induced by a user of said device on said central support platform.

2. A surgical simulation and training system comprising:
a stationary base;
a support frame attached to said stationary base; wherein
said support frame supports a nested ring structure; wherein
said support frame has a support frame inside surface; wherein
said support frame inside surface has a surface normal pointing toward said nested ring structure; wherein
said support frame inside surface has one and at most two attachments to an outer ring of said nested ring structure; wherein
said attachments comprise:
a first shaft and an second shaft; wherein the longitudinal axes of said each first shaft and said second shaft are coaligned when said second shaft is present; wherein
said each first shaft and said second shaft have a circular cross-section; wherein
said each first shaft and said second shaft have a proximal end and a distal end; wherein
said each proximal end of said first shaft and said second shaft is attached to said support frame inside surface; wherein
said each distal end of said first shaft and said second shaft is attached to said outer ring of said nested ring structure; wherein
said longitudinal axis of said each first shaft and said second shaft form a rotational axis for said outer ring; wherein
said each support frame dimensions, said outer ring diameter, and said outer ring cross section are sized such that said outer ring can rotate unimpeded about a rotational axis coinciding with said longitudinal axis of said each first shaft and said second shaft;
said nested ring structure further comprising:
an inner ring; wherein
said outer ring has a larger diameter than said inner ring; wherein
said outer ring and said inner ring are concentric; wherein
said outer ring has an outer ring inside surface; wherein
said outer ring inside surface has a surface normal pointing toward said inner ring; wherein
said outer ring inside surface has one and at most two attachments to said inner ring of said nested ring structure; wherein
said attachments comprise:
a third shaft and an fourth shaft; wherein
the longitudinal axis of said each third shaft and said fourth shaft are coaligned when said fourth shaft is present; wherein
said each third shaft and said fourth shaft have a circular cross-section; wherein
said each third shaft and said fourth shaft have a proximal end and a distal end; wherein
said each proximal end of said third shaft and said fourth shaft is attached to said inside surface of said outer ring; wherein
said each distal end of said third shaft and said fourth shaft is attached to said inner ring of said nested ring structure; wherein
the longitudinal axis of said each third shaft and said fourth shaft form a rotational axis of said inner ring; wherein
said each outer ring dimensions, said inner ring diameter, and said inner ring cross section are sized such that said inner ring can rotate unimpeded about a rotational axis coinciding with said longitudinal axis of said each third shaft and said fourth shaft;
a central support platform; wherein
said central support platform and said inner ring are concentric; wherein
said central support platform has an attached device mounted to said central support platform; wherein
said device attached to said central support platform is chosen from the group consisting essentially of a smartphone, tablet computer, mini-tablet computer, and combinations thereof; wherein
said device registers displacements of said central support platform induced by a user in real-time; wherein
said inner ring has a larger diameter than said central support platform with said device attached; wherein
said inner ring has an inner ring inside surface; wherein
said inner ring inside surface has a surface normal pointing toward said central support platform; wherein
said inner ring inside surface has one and at most two attachments to said central support platform; wherein
said attachments comprise:

a fifth shaft and an sixth shaft; wherein the longitudinal axis of said each fifth shaft and said sixth shaft are coaligned when said sixth shaft is present; wherein said each fifth shaft and said sixth shaft have a circular cross-section; wherein said each fifth shaft and said sixth shaft have a proximal end and a distal end; wherein said each proximal end of said fifth shaft and said sixth shaft is attached to said inside surface of said inner ring; wherein said each distal end of said fifth shaft and said sixth shaft is attached to said central support platform; wherein the longitudinal axis of said each fifth shaft and said sixth shaft form a rotational axis of said central support platform; wherein said each inner ring dimensions, said central support platform diameter, and said central support platform cross section are sized such that said central support platform with said device attached can rotate unimpeded about a rotational axis coinciding with said longitudinal axis of said each fifth shaft and said sixth shaft; wherein said stationary base and said support frame remains stationary during motion induced by a user of said device on said central support platform.

3. The surgical simulation and training system recited in claim 2; further comprising accelerometers that measure motion of said central support platform.

4. The surgical simulation and training system recited in claim 2; further comprising: an external monitor connected to said device; wherein said external monitor displays visual scenes from software applications implemented in said device; wherein said visual scenes are manipulated in said device in real-time by user induced motion of said device and mirrored in real-time on said external monitor.

5. The surgical simulation and training system recited in claim 2; further comprising: a game controller; wherein said game controller transmits user induced motion of said central support platform to said device; wherein said game controller is chosen from the group consisting essentially of a rod, pen, pencil, joystick, stylus, an eyepiece assembly of a fiber optic surgical scope, a surgical tool adapter, a surgical tool, and combinations thereof.

6. The surgical simulation and training system recited in claim 2; further comprising: said support frame attached to said stationary base at an adjustable angle; wherein said adjustable angle can be manipulated to approximate planes tangent to contours of the human body.

7. The surgical simulation and training system recited in claim 5; further comprising: games using said game controller to promote development of relevant hand-eye coordination skills in surgical scenarios, entertainment game scenarios, and rehabilitation of patients with chronic degenerative lesions impairing joint motion.

\* \* \* \* \*